United States Patent
Humes

(10) Patent No.: US 7,131,561 B2
(45) Date of Patent: Nov. 7, 2006

(54) CONFORMABLE BOAT RACK

(75) Inventor: Daniel M. Humes, Trinidad, CA (US)

(73) Assignee: Yakima Products, Inc., Beaverton, OR (US)

( * ) Notice: Subject to any disclaimer, the term of this patent is extended or adjusted under 35 U.S.C. 154(b) by 493 days.

(21) Appl. No.: 10/053,209

(22) Filed: Jan. 16, 2002

(65) Prior Publication Data

US 2002/0125283 A1 Sep. 12, 2002

Related U.S. Application Data

(60) Provisional application No. 60/262,053, filed on Jan. 16, 2001.

(51) Int. Cl.
*B60R 9/00* (2006.01)

(52) U.S. Cl. ............... 224/319; 188/32; 224/310; 224/325; 224/324; 410/50

(58) Field of Classification Search ............ 224/319, 224/404, 405, 309, 316, 321, 727, 324, 567, 224/570, 572, 50, 571, 327, 318, 310, 325; 248/560, 580, 603, 611, 610, 613, 632, 634; 188/32
See application file for complete search history.

(56) References Cited

U.S. PATENT DOCUMENTS

| 1,789,458 | A | * | 1/1931 | Bureau ................ 188/32 |
| 2,248,170 | A | | 7/1941 | Hansen |
| 2,302,300 | A | | 11/1942 | Davies |
| 2,536,797 | A | | 1/1951 | Cooke |
| 2,551,218 | A | * | 5/1951 | Menne ................ 188/32 |
| 2,723,005 | A | * | 11/1955 | Wink .................. 188/32 |
| 2,988,253 | A | | 6/1961 | Menghi |
| 3,001,679 | A | | 9/1961 | Canning et al. |
| 3,005,213 | A | * | 10/1961 | Brown et al. ......... 297/452.52 |
| 3,113,642 | A | * | 12/1963 | Lay ..................... 188/32 |
| 3,190,587 | A | * | 6/1965 | Fries .................. 244/106 |
| 3,276,085 | A | | 10/1966 | Spranger |
| 3,737,083 | A | | 6/1973 | Lund |
| 3,946,917 | A | * | 3/1976 | Crawford et al. ...... 224/317 |
| 3,993,167 | A | * | 11/1976 | Reed ................... 188/32 |
| 4,022,362 | A | | 5/1977 | Revercomb |
| 4,023,761 | A | | 5/1977 | Molis |
| 4,326,655 | A | | 4/1982 | Gradek et al. |
| 4,350,380 | A | | 9/1982 | Williams |
| 4,751,891 | A | * | 6/1988 | Wilson ................ 114/219 |
| 4,817,838 | A | | 4/1989 | Kamaya |
| 4,830,249 | A | * | 5/1989 | Mirenda et al. ....... 224/310 |
| 4,848,794 | A | | 7/1989 | Mader et al. |
| 4,895,096 | A | * | 1/1990 | Goodwin et al. ...... 114/381 |
| 4,961,524 | A | | 10/1990 | Hunts |
| 5,118,020 | A | | 6/1992 | Piretti |

(Continued)

FOREIGN PATENT DOCUMENTS

DE 4229268 3/1994

(Continued)

*Primary Examiner*—Tri M. Mai
(74) *Attorney, Agent, or Firm*—Kolisch Hartwell, P.C.

(57) ABSTRACT

A boat rack apparatus for carrying a boat on a vehicle roof rack includes a plurality of conformable support members. Each support member has an expanse that contacts a boat hull. The expanse is supported by a rib arrangement, including a spring rib and a load rib. The spring rib underlies a flexible portion of the expanse. The load rib provides vertical support to the expanse. The support member adapts to different boat hull shapes.

4 Claims, 4 Drawing Sheets

U.S. PATENT DOCUMENTS

| | | |
|---|---|---|
| 5,123,147 A | 6/1992 | Blair |
| 5,131,669 A * | 7/1992 | Kinnamon et al. .... 280/33.992 |
| 5,388,938 A | 2/1995 | Helton |
| 5,416,957 A | 5/1995 | Renzi, Sr. et al. |
| 5,442,840 A | 8/1995 | Ewald |
| 5,516,017 A | 5/1996 | Arvidsson |
| 5,535,930 A * | 7/1996 | Lee ............................ 224/321 |
| 5,582,044 A | 12/1996 | Bolich |
| 5,617,617 A | 4/1997 | Gustin |
| 5,647,522 A | 7/1997 | Routh |
| D386,145 S * | 11/1997 | Staller ....................... D12/412 |
| 5,738,258 A | 4/1998 | Farrow et al. |
| 5,769,291 A * | 6/1998 | Chasan ....................... 224/324 |
| 5,775,557 A | 7/1998 | Arvidsson |
| 5,810,226 A * | 9/1998 | Lee ............................ 224/321 |
| 6,164,507 A * | 12/2000 | Dean et al. .................. 224/324 |
| 6,189,868 B1 * | 2/2001 | Santelli, Jr. .................. 256/25 |

FOREIGN PATENT DOCUMENTS

| | | |
|---|---|---|
| FR | 1.400.231 | 4/1965 |
| FR | 2 519 305 | 7/1983 |
| FR | 2624808 | 12/1987 |
| GB | 2257463 | 1/1993 |

* cited by examiner

Fig. 1
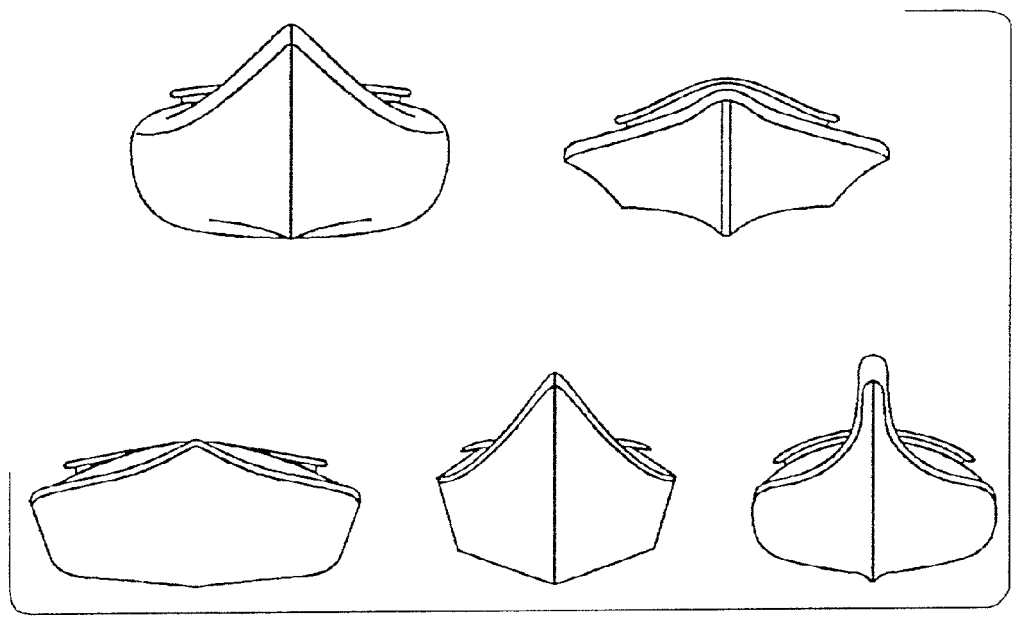
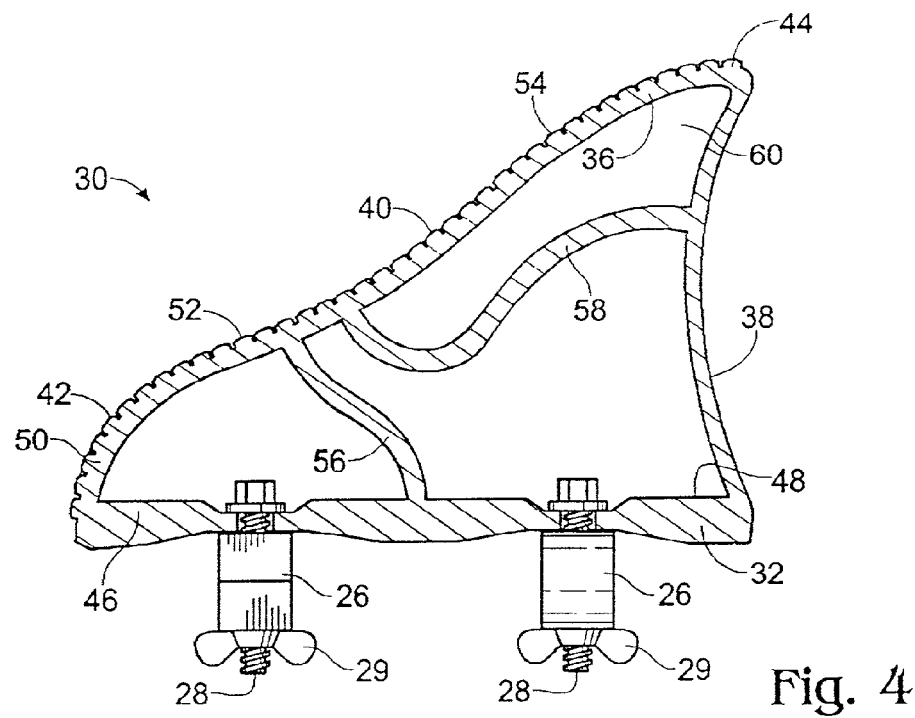
Fig. 4

CONFORMABLE BOAT RACK

CROSS-REFERENCE TO RELATED APPLICATIONS

This application is based upon and claims benefit under 35 U.S.C. § 119 from the following U.S. Provisional Patent Application, which is incorporated herein by reference: Ser. No. 60/262,053, filed Jan. 16, 2001.

FIELD OF THE INVENTION

The invention relates to vehicle racks and more particularly to vehicle racks for carrying a boat. In particular, the invention relates to a vehicle rack support device that conforms to the shape of a boat hull.

BACKGROUND OF THE INVENTION

Popularity for small boats and related sports has increased in recent years. New innovations in boat materials and hull designs have made sports such as kayaking and canoeing more accessible to a wide range of enthusiasts from the novice to the experienced outdoorsmen. Small boats are now commonly used for recreation in rivers, lakes, and oceans.

As more people become involved in small boating sports, there has been an increased demand for boat transport devices. Boats are often too big to fit inside a vehicle. Trailers may be cumbersome or unusable on some automobiles, particularly if a sportsman wishes to transport the boat over rough terrain. Therefore, vehicle roof racks have become the frequently preferred transport device for carrying small boats.

Accessories for conventional vehicle racks are available for transporting boats. For example, an accessory may use a cradle type berth to support a boat hull. However, a problem with cradle type racks is that they may be unsatisfactory for some hull shapes. Boat hulls come in different shapes. FIG. 1 shows examples of different boat hull profiles. Some hulls are wider, while others are narrower. Some are rounded while others have one or more distinct angles. These differences in hull shape create difficulties with a one design fits all boat accessory. Prior boat racks typically work well for one boat design and not so well for other designs because they do not provide adequate capacity to adjust and conform to different hull profiles.

If the hull does not adequately fit the cradle due to hull shape or inclination of the hull sides, the craft may roll back and forth on the hull as it is transported. This can put undue strain on the hull. An unsatisfactory solution has been to place towels or other types of padding between the rack and the boat hull, to prevent the boat from slipping and also providing extra support along the hull. However, suitable padding material may not be available or may not adequately support the boat.

An objective of the invention is to provide a boat rack design that is adaptable to different boat hull shapes, while also being simple to manufacture, rugged and substantially weatherproof.

SUMMARY

The invention provides a boat rack apparatus for carrying a boat on a vehicle roof rack. The rack employs a conformable support member having an expanse that contacts a boat hull. The expanse is supported by a rib arrangement. In a preferred embodiment, a base is configured to attach to a vehicle rack. A resilient expanse extends upward from the base portion. A spring rib supports the expanse providing flexibility to an upper mid-portion of the expanse so that the expanse may compress according to the shape of a particular boat hull. The expanse may also be supported by a load rib so that a lower portion of the expanse is at least partially stiffened in comparison to the upper portion of the expanse.

BRIEF DESCRIPTION OF THE FIGURES

FIG. 1 shows a series of front views of different boat hulls.

FIG. 4 is a cross-sectional view of the support member shown in FIG. 3.

DETAILED DESCRIPTION

Boat hulls for small watercraft may have significantly different hull shapes. FIG. 1 shows examples of different hull shapes. The hulls not only vary in width and height, but also vary in roundness and actual angular shape. The invention provides conformability to a boat rack so that any one of the hulls shown in FIG. 1, as well as other hull shapes, may be safely secured to and transported on a vehicle rack.

Figure 2:
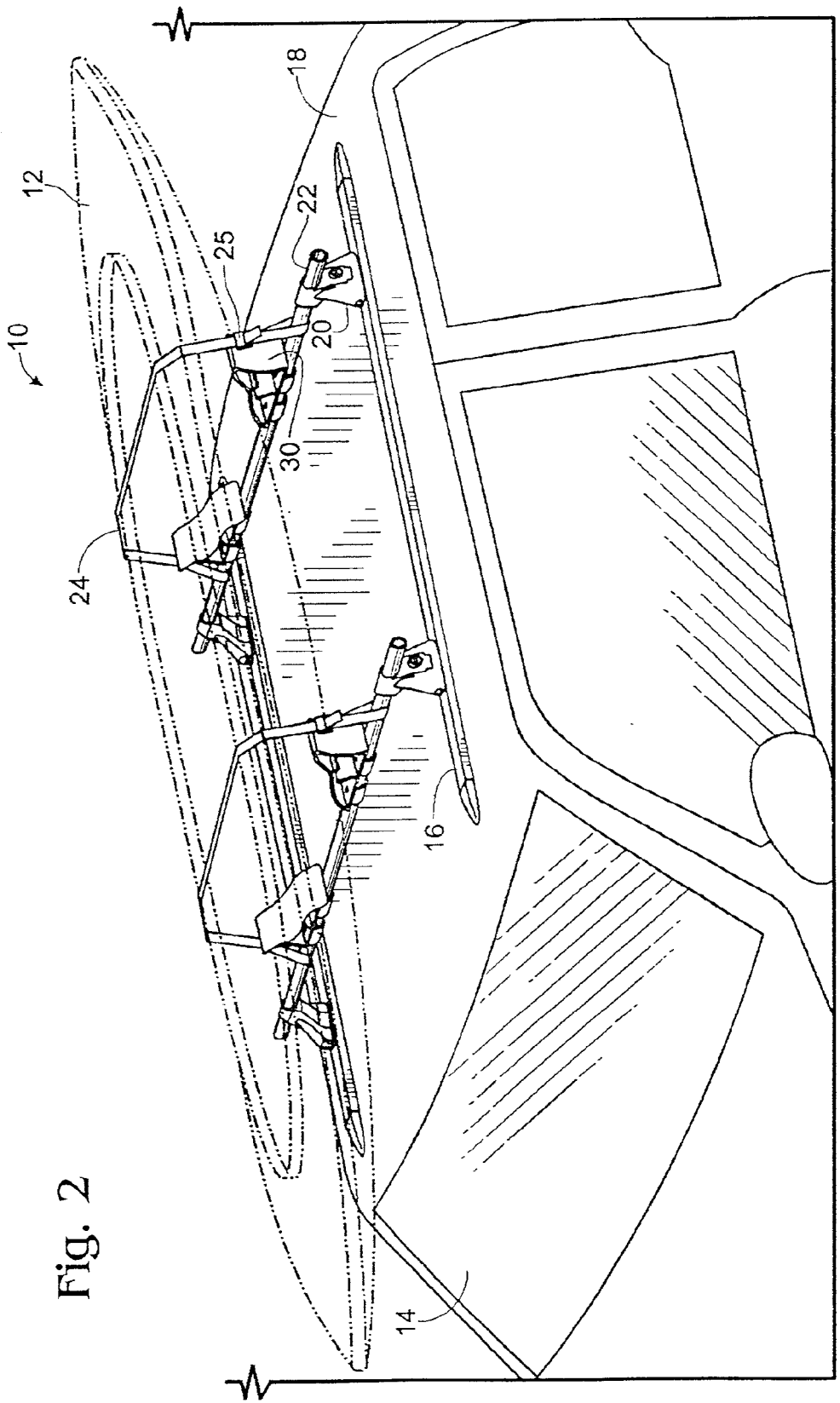
FIG. 2 is a perspective view of a boat rack mounted on an automobile according to a preferred embodiment of the invention.

A boat rack for carrying boats or other small watercraft is shown generally at 10 in FIG. 2. Boat rack 10 supports boat 12 on vehicle 14. Boat rack 10 may be attached to a factory rack system 16 on vehicle roof 18 as shown in FIG. 2. Alternatively, the rack may be attached to rain gutters or other parts of a vehicle, or may be placed in the bed of a pick up truck, or on a trailer.

As shown in FIG. 2, towers 20 are configured to be mounted on either side of roof 18 of vehicle 14. Towers 20 are positioned in opposing pairs so that a first tower is mounted on one side of vehicle roof 18 and an opposing second tower is mounted on the opposite side of vehicle roof 18. Substantially cylindrical elongate crossbars 22 are attached to each opposing pair of towers and extend laterally across the vehicle roof.

A wide variety of accessories or attachments have been developed for the rack system shown in FIG. 2. These accessories are generally secured to the crossbar using a variety of fastening devices. By using different rack accessories, it is possible to carry a wide assortment of large items, including, but not limited to, bicycles, boats, skis, and snowboards, on a vehicle using the same basic tower and crossbar assembly.

The rack system, as shown in FIG. 2, is configured to carry a boat. Two pairs of attachments or support members 30 are attached to crossbars 22. Attachments 30 are positioned on each crossbar facing each other so that a berth is formed to cradle a boat. The boat hull rests on attachments 30. Boat 12 may be further secured to the rack by fastening strap 24. Fastening strap 24 may be any suitable type of webbing, or other type of fastening device that may be used to secure boat 12 to the rack. Any suitable configuration may be used. For example, in FIG. 2, a pair of straps 24, one for each crossbar, is used to secure boat 12 to rack 10. Strap 24 may be snapped or looped around crossbar 22 and adjusted by tightening or loosening the strap. Buckle 25 may also be used to adjust the tension of the strap. Once strapped to the rack, boat 12 can be safely transported on vehicle 14.

Figure 3:
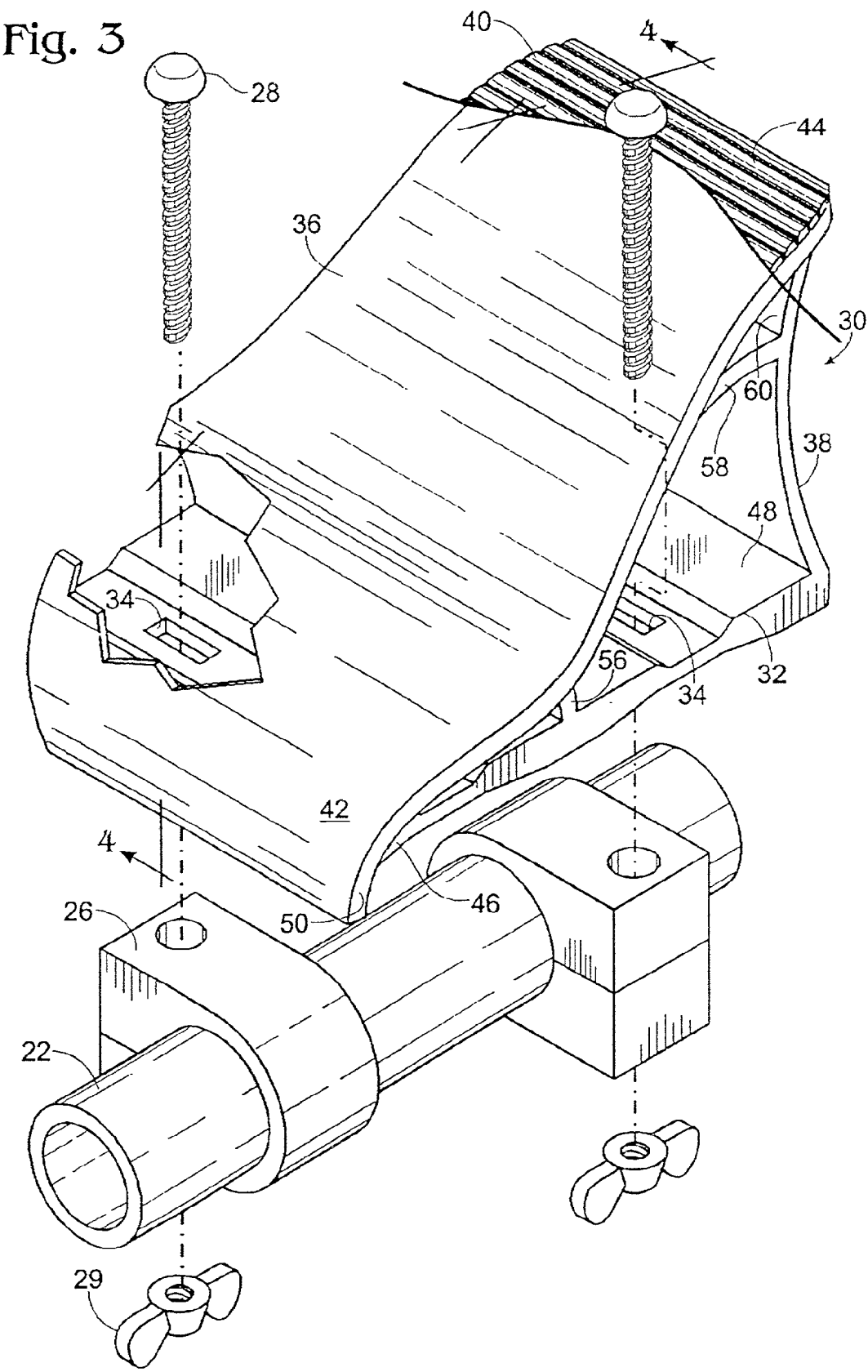
FIG. 3 is a partially fragmented isometric view of a support member for carrying a boat according to an embodiment of the invention.

As shown in FIGS. 3 and 4, attachment 30 includes base 32 that is adapted for securing on crossbar 22. Base 32 is substantially parallel to crossbar 22. Base 32 is attached to crossbar 22 through one or more couplers, such as C-shaped clamps 26. Clamps 26 are shaped to conform to the cylindrical shape of such that the clamps may slide on the crossbar 22. The ends of the clamps are adjustable so that the clamp may be opened and secured in place on the crossbar.

As shown in FIG. 3, base 32 has slots 34 sized to receive bolts 28 for mounting of the base 32 to clamp 26. In one embodiment, slots 34 are slightly larger than bolts 28, such that the bolts 28 may slide within slots 34 to enable a user to adjust the position of attachment 30 in order to fully support a particular hull design. Specifically, in the above-described slot configuration, attachment 30 may be rotated to accommodate different boat shapes and widths.

The ends of clamps 26 also have corresponding holes or slots for receiving bolts 28. Wing nuts 29 or other similar types of fastening devices may be used with bolts 28. When wing nut 29 is tightened, ends of clamp 26 are drawn together so that the clamp tightly grips crossbar 22. Wing nut 29 may be configured to allow hand tightening of clamp 26 against crossbar 22.

In FIG. 3, base 32 of attachment 30 includes an arrangement of four slots 34, which allows the use of two couplers or clamps 26 to provide maximum stability to the attachment. Wing nuts 29 are adapted to receive bolts 28. It should be noted that other configurations, such as alternative types of couplers or fasteners or a different arrangement or number of slots, may be used to secure the attachment to the crossbar or vehicle roof.

Attachment 30 is generally wedge-shaped and typically includes a sloped face 36 and a back wall, also referred to as outer face or outer support 38. Attachment 30 is positioned so that sloped face 36 contacts the boat hull. Outer face 38 projects upward generally perpendicular to base 32. Outer face 38, as shown in FIGS. 3 and 4, is slightly concave.

Sloped face 36, also referred to as an expanse or contact surface, directly contacts and supports the boat hull. Contact surface 36 may be slightly concave such that the attachment generally follows the shape of a boat hull. Contact surface 36 may have an anti-slip surface 40. Surface 40 may be made of a rubber or plastic material and may be textured to grip the external surface of a boat. Anti-slip surface 40 in FIGS. 3 and 4 is notched. Other surfaces that operate to increase friction between the boat and the attachment also may be used.

Contact surface 36 has first end portion 42 and second end portion 44. Base 32 has first end portion 46 and second end portion 48. First end portion 46 of the base is positioned closest to the center of the boat hull. Contact surface 36 is connected to base 32 via outer face 38 and inner support portion 50. Inner support portion 50 connects base 32 to the sloped portion of contact surface 36. Outer face 38 is configured to extend generally vertically from second end portion 44 of contact surface 36 to second end portion 48 of base 32.

The rack attachments shown in FIGS. 3 and 4 provide a support configuration that substantially molds to the shape of a boat hull. The moldable characteristic of attachment 30 may be accomplished by providing a shell with a chambered or celled configuration. The chambers or cells do not need to be fully enclosed or separated, but rather are representative of different response regions of the attachment. In particular, the chambers are defined as underlying both a rigid portion 52 and a flexible portion 54 of the contact surface.

As shown in FIG. 4, the rigid or stiff portion 52 of contact surface 36, has a support or load rib 56 that operates as a brace for supporting much of the weight of the boat along with supports 38 and 50. Load rib or first internal support 56 extends between contact surface 36 and base 32 and is interposed between outer support 38 and inner support 50 of attachment 30. As shown, load rib 56 is attached to a central region of base 32. Load rib 56 projects generally upward from the base and perpendicular to contact surface 36 and to the shell of a boat. In use, the portion of contact surface 36 supported by load rib 56 remains relatively stiff.

Flexible portion 54 of contact surface 36 is supported by spring rib or second internal support 58. Spring rib 58 allows compression of contact surface 36 and is spaced apart from contact surface 36. An associated chamber or partial chamber 60 is formed between contact surface 36 and spring rib 58. Chamber 60 adapts and conforms when a boat hull rests on contact surface 36. As depicted in FIG. 4, spring rib 58 is substantially parallel to contact surface 36. Upper portion of contact surface 36 is more flexible and more accommodating than the lower portion of contact surface 54. This flexible portion provides a moldable characteristic to the attachment where the attachment generally molds to the shape of a boat hull. Although not shown, other rib configurations are possible which may operate to provide a suitable flexible portion along contact surface 36.

Figure 5:
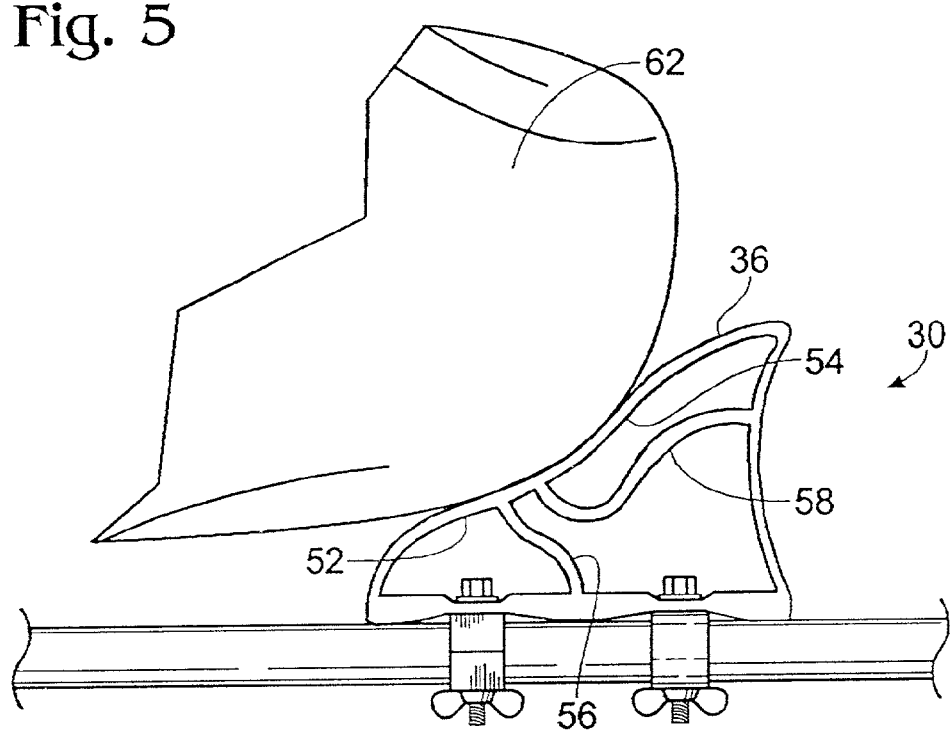
FIGS. 5 and 6 are partial side views of a support member conforming to different boat hull profiles.
Figure 6:
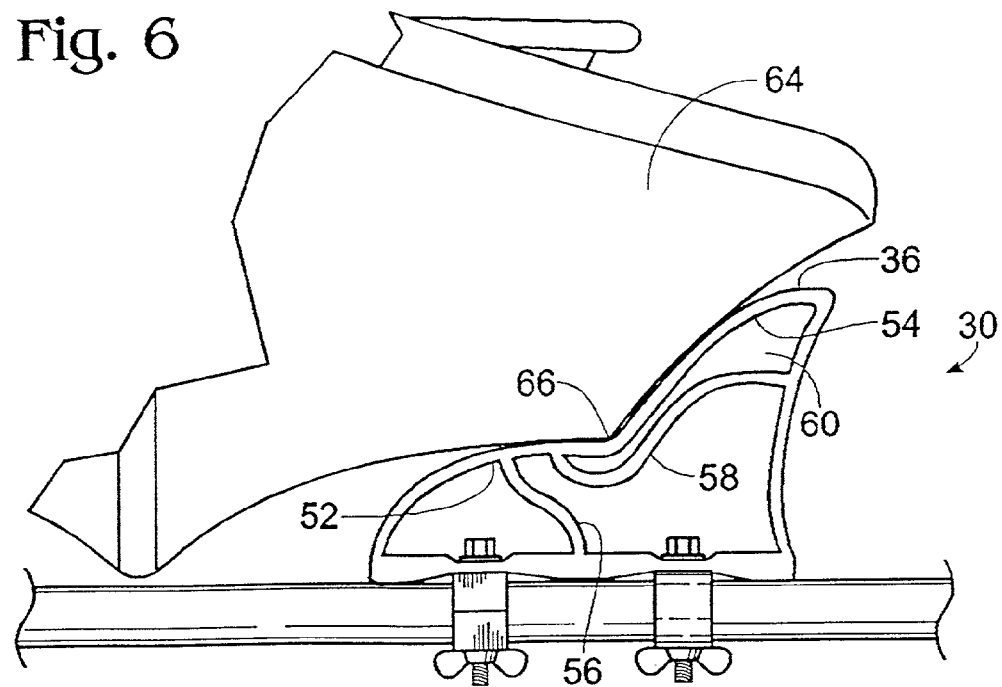

The moldable characteristic of attachment 30 is evident in FIGS. 5 and 6. In FIG. 5, round boat hull 62 is shown resting on attachment 30. Contact surface 36 is slightly compressed along flexible portion 54 of contact surface 36 such that the concavity of the surface matches the roundness of boat hull 62. Rigid lower portion 52 of contact surface 36 remains relatively stiff to support the weight of the boat hull and to maintain the boat hull in a secure position on the rack.

Similarly, in FIG. 6, boat hull 64 rests on attachment 30. Boat hull 64 has a chine or crest 66 projecting outward along the side of the hull. Chine 66 is accommodated by attachment 30 by the compression of contact surface 36 along flexible portion 54. Spring rib 58 and contact surface 36 flex altering deformable chamber 60 as hull 64 is positioned on the attachment. When boat hull 64 is removed from attachment 30, deformable chamber 60 will return to its original shape. Primary load support of hull 64 is due to stiff portion 52 and load rib 56. Both stiff portion 52 and load rib 56 maintain substantially the same positions in FIGS. 5 and 6.

It should be appreciated that attachment 30 as shown in the embodiments may be manufactured as a single integral unit. Attachment 30 including the ribs may be composed of high-density polyethylene, polypropylene, nylon or any other similar type of material. With construction being a single integrated unit, the attachment is easily manufactured as well as being weatherproof and rust resistant. Moreover, the chambers defined by the ribs and the shell of the attachment may be open or closed. In addition, the chambers may also be filled with a material to further the conformability aspect of the invention.

Although the invention has been disclosed in its preferred forms, the specific embodiments thereof as disclosed and illustrated herein are not to be considered in a limiting sense, because numerous variations are possible. Applicants regard the subject matter of their invention to include all novel and non-obvious combinations and subcombinations of the various elements, features, functions, and/or properties disclosed herein.

I claim:

1. A rack for carrying a boat comprising:
a pair of tower bodies, each body having a mechanism for attaching the body to the top of an automobile,
a crossbar connected to the tower bodies, and
a pair of support members connected to the crossbar, each support member having a base, a back wall, and a slope expanse forming a wedge shape and creating an internal space, the expanse having an upper portion and a lower portion for contacting a boat hull, and a curved load rib, extending through the internal space and connecting the expanse to the base, the load rib providing support to the lower portion of the expanse so that the upper portion of the expanse is substantially more flexible than the lower portion to accommodate different hull shapes.

2. The rack of claim 1, further including a spring rib extending through the internal space and connecting the expanse to the back wall supporting the upper portion of the expanse.

3. The rack of claim 1, wherein the base for each support member is substantially parallel to the crossbar.

4. The rack of claim 1, wherein the expanse, base, back wall, and rib are all formed of a single piece of material.

* * * * *